T. J. POWERS.

Metallic Cartridge.

No. 3,638.

Reissued Sept. 14, 1869.

WITNESSES

Edwd C Chamberlin

J A Hubbell

INVENTOR

Thos Jas J. Powers

UNITED STATES PATENT OFFICE.

TIMOTHY J. POWERS, OF NEW YORK, N. Y.

IMPROVEMENT IN METALLIC CARTRIDGES.

*Specification forming part of Letters Patent No.* 50,536, *dated October* 17, 1865; *reissue No.* 3,638, *dated September* 14, 1869.

*To all whom it may concern:*

Be it known that I, TIMOTHY J. POWERS, of the city of New York, have invented a new and useful Shot-Cartridge for Fire-Arms; and I do hereby declare that the following is a full and exact description thereof, reference being had to accompanying drawings, and the letters of reference marked thereon, forming part of this specification.

The peculiarity which distinguishes the shot-cartridge that constitutes my invention from all others is, that the cylindrical part of the shot-case is composed of detached longitudinal strips of metal or other suitable material, so constructed that the shot are held securely in the case before the case is put into the gun, and while in it, but will separate after being fired from the gun, and thus liberate the shot.

To enable others skilled in the art to make and use my invention, I will proceed to describe its construction and mode of operation.

Figure 5:
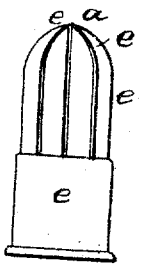
Figure 6:
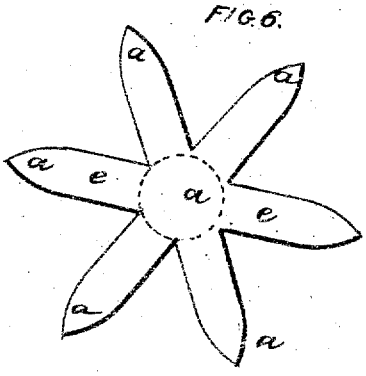

Figure 6 represents a form into which a piece of thin sheet metal or other suitable material may be cut, of which the case is to be formed. The radial strips *c* may then be turned at right angles with the center *a* over a round punch or mandrel, so that the edges are brought together; then passing the whole through a proper die, a round tube or case is formed having a closed base, and the opposite extremity presenting the pointed ends *d*. These ends are then brought together into the form shown in Fig. 5, the shot having been previously introduced or a small portion of the pointed ends may be cut off, which will leave an aperture at the top when the ends are brought together, through which the shot may be introduced, and the aperture closed by pasting paper over it, or otherwise.

The form above described is best adapted for breech-loading guns. For muzzle-loading the case had best be made entirely cylindrical, instead of conical at the upper end, by cutting the strips *e* straight their entire length, and then the shot are to be retained in the case by a suitable wad placed and fastened over the open end of the case.

Figure 1:
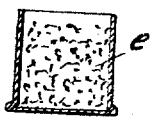
Figure 2:
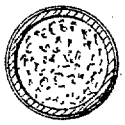
Figure 4:
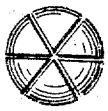
Figure 3:
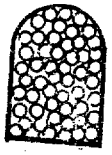

When the case has been thus formed the strips are to be held tightly together by either a drop of solder on the ends or by a coil of paper or other material wound about the case, and fastened with gum or some other adhesive agent. The diameter of the case should, of course, be adapted to the caliber of the gun in which it is to be used. This case may be used in muzzle-loading guns, or it may be combined with a metallic cartridge-case for breech-loading guns. When thus combined, the cartridge-case may be made in the ordinary way, as shown in Figs. 1 and 2, Fig. 1 being a central sectional view of a metallic cartridge-case filled with gunpowder, and Fig. 4 a cross-section of the same. Fig. 3 is a central sectional view of the shot-case filled with shot. Fig. 4 is an end surface view of the apex of the shot-case; and Fig. 5, a view of an ordinary breech-loading gun, cartridge-case, and shot-cartridge entire, combined with a cartridge-case for breech-loading guns.

I do not intend to limit myself to the particular mode described of cutting or forming the strips *c*, designed for the shot-case. In place of cutting from a sheet of metal or other material a star-shaped piece with the points outward and the bases united at the center, the said strips may radiate from the center with their bases outward and the points *a* attached at the center. The tube which they will then form will be slenderly closed at the conical end and open at the base, which may be closed with a suitable wad or otherwise; or separate strips may be used, crossed at the center, basket-fashion, and fashioned into a tube or case, as described, the essential thing being that the shot-case shall be formed of strips of metal or other suitable material, arranged longitudinally, as described, adapted to hold the shot before, and while being fired from a gun, and to separate and liberate the shot after leaving the gun when fired from it.

What I claim as my invention, and desire to secure by Letters Patent, is—

A shot cartridge consisting of the case, Fig. 2, formed of strips *e*, of metal or other suitable material, longitudinally arranged in cylindrical form, loaded with shot, constructed and arranged substantially as specified.

TIMOTHY J. POWERS.

Witnesses:

J. P. FITCH,

EDWARD C. CHAMBERLIN.